United States Patent [19]
Holbrook

[11] 3,796,297
[45] Mar. 12, 1974

[54] CUP CHAIN CONVEYOR FOR FRUIT
[75] Inventor: Franklin K. Holbrook, Whittier, Calif.
[73] Assignee: Brown International Corporation, Covina, Calif.
[22] Filed: Feb. 5, 1973
[21] Appl. No.: 329,876

[52] U.S. Cl. .......................... 198/131, 16/2, 99/504
[51] Int. Cl. ............................................. B65g 19/04
[58] Field of Search ............. 198/131; 16/2, 43, 136

[56] References Cited
UNITED STATES PATENTS
| 2,631,625 | 3/1953 | Wells | 198/131 |
| 3,250,374 | 5/1966 | Anderson | 198/131 |
| 3,310,152 | 3/1967 | Elford | 198/131 |
| 3,200,559 | 8/1965 | Curtis | 198/131 |

Primary Examiner—Richard E. Aegerter
Assistant Examiner—Jeffrey V. Nase
Attorney, Agent, or Firm—Paul A. Weilein

[57] ABSTRACT

In a fruit processing apparatus incorporating a chain of elastomer conveyor cups with each cup formed with a single ear at one end and a pair of ears at the other end, each pair of ears straddling a single ear of an adjacent cup with a pivot bushing extending through aligned pivot bores of the three ears and wherein a drive wheel has a circumferential series of laterally projecting drive pins that enter inner ends of the successive pivot bushings briefly to actuate the conveyor, the present invention improves the anchorage of the pivot bushing by providing the opposite ends of the pivot bushing with oppositely facing outer circumferential shoulders and by providing the bores through the two straddling ears with inner oppositely facing circumferential shoulders that cooperate with the outer circumferential shoulder to prevent axial shift of the pivot bushing in opposite axial directions.

11 Claims, 5 Drawing Figures

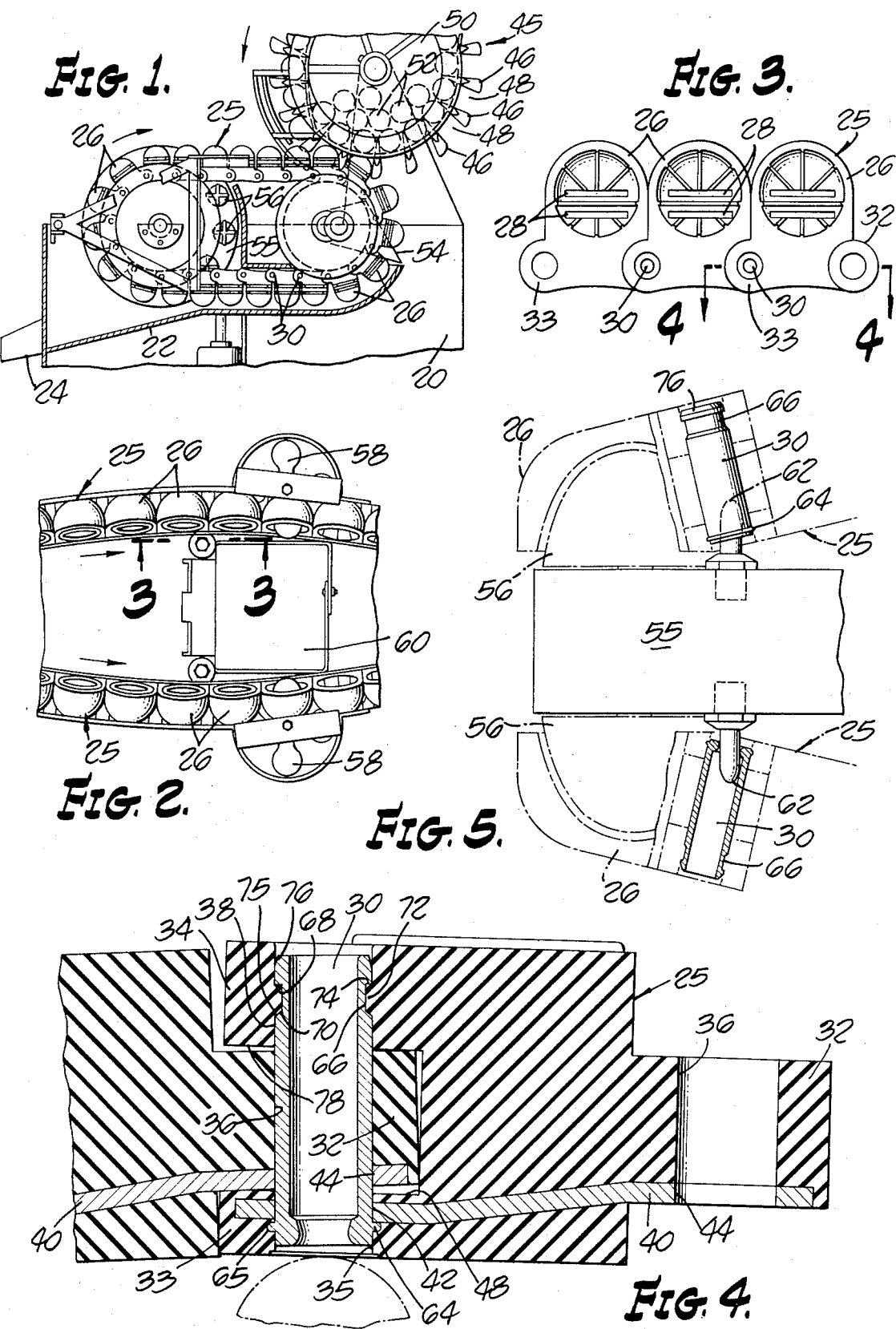

CUP CHAIN CONVEYOR FOR FRUIT

BACKGROUND OF THE INVENTION

This invention relates to the construction of a fruit processing apparatus of the general character disclosed in the Wells U.S. Pat. No. 2,631,625 dated Mar. 17, 1953 which patent is hereby incorporated into the present disclosure by reference. More particularly, the present invention pertains to the pair of cooperative conveyors in the Wells patent each of which comprises a series of elastomer cups which hold halves of bisected citrus fruit, the cups being linked together by hollow pivot bushings mounted in ears of the cups. With the two coextensive cup chains confronting each other, the two cup chains are relatively close together at their opposite ends and spreading apart at their midregions. A rotary feeder supplies fruit to the pair of cup chains at one of their convergent ends where a knife bisects the fruit leaving halves of fruit in the cups of the two chains. Near the opposite converging end of the pair of cup chains a circumferential series of reamer units on a power-actuated rotary juicer head enters the successive cups to extract juice from the fruit. The rotary juicer head is power driven and has two opposite sets of laterally projecting drive pins that briefly enter the successive hollow bushings of the two cup chains to actuates the two cup chains.

In the 24 years that have elapsed since the filing of the application for the Wells patent, a persistent problem has been the tendency for the pivot bushings to loosen and shift axially in the aligned bores of the cups. This tendency is caused by the drive pins of the juicer head applying high magnitude frictional drag forces to the hollow bushings in alternate axial directions as the drive pins repeatedly enter and withdraw from the pivot bushings at acute angles. Too often an axial shift does occur to cause a pivot bushing to protrude into a path that interferes with other rapidly moving parts of the apparatus with the consequence that extensive wreckage of the parts occurs before the apparatus can be shut down.

Since the axial frictional drag on a pivot bushing when a drive pin enters the inner end of the bushing appears to exceed the opposite axial frictional drag when the drive pin withdraws, the emphasis has heretofore been on preventing axially outward shift of the pivot bushing and accordingly the inner end of a conventional pivot bushing has been formed with a radial bead to abut a metal reinforcement that is embedded in the cup. The opposite inward axial shift of the pivot pin has been discouraged to lesser degree by forming the pivot bore in the cup with an inner circumferential groove to seat the bead of the pivot bushing. The development of any further expedient to anchor the pivot bushing has been hindered by the necessity of the pivot bushing being removable to permit substitution of new pivot bushings for a worn pivot bushing.

SUMMARY OF THE INVENTION

A primary object of the invention is to provide means in releasable positive engagement with the pivot bushing not only to prevent outward axial shift of the pivot bushing but also to prevent inward axial shift, and further to provide such double-locking means that will permit ready replacement of a pivot bushing when desired. This object is attained by providing the outer end of the pivot bushing with a circumferential groove and forming the elastomer of the corresponding ear of the cup with an inner circumferential rib that seats snugly in the circumferential groove.

To provide positive engagement of the elastomer with the pivot bushing in such manner as to prevent inward axial shift of the pivot bushing, one side of the circumferential groove in the pivot bushing forms a radial shoulder perpendicular to the axis of the bushing which abuts a similar perpendicular complementary radial shoulder of the inner circumferential elastomer rib. Thus the conventional radial flange of the bushing cooperates with the embedded reinforcement of the cup to prevent shift of the pivot bushing in one axial direction and shift in the opposite axial direction is blocked by abutment of the radial shoulder of the elastomer rib with the complementary radial shoulder formed by one side of the circumferential groove of the pivot bushing. To facilitate installation of the pivot bushing the second side of the circumferential groove in the pivot bushing and the corresponding second side of the elastomer rib are both beveled.

A further feature of the invention is that a chamfer on the leading end of the pivot bushing not only facilitates installation of the pivot bushing but also cooperates with a suitable tool for disengaging the circumferential elastomer rib from the pivot bushing to facilitate removal of the pivot bushing in the event such removal is required.

A further feature of the invention is the concept of insuring a tight installation of the pivot bushing by preloading the pivot bushing under tension. For this purpose the elastomer of the cup is elastically deformed by the installation of the pivot bushing, energy being stored in the elastic material to keep the pivot bushing under axial tension that precludes any looseness of the pivot bushing in the aligned bores of the cups.

The features and advantages of the invention may be understood by reference to the following detailed description and the accompanying drawings.

BRIEF DESCRIPTION OF THE DRAWINGS

In the drawings, which are to be regarded as merely illustrative:

FIG. 1 is a fragmentary side elevational view, partly in section, of an apparatus incorporating the present invention;

FIG. 2 is a fragmentary plan view of the pair of cooperating cup chains of the apparatus;

FIG. 3 is a fragmentary elevational view of one of the cup chains as seen along the line 3—3 of FIG. 2;

FIG. 4 is an enlarged fragmentary sectional view as seen along the line 4—4 of FIG. 3 showing a pivot bushing installed in the aligned bores of overlapping ears of a pair of successive cups of a cup chain; and FIG. 5 is a sectional view, partly in phantom, showing how the opposite sets of drive pins of the juicer head briefly enter the successive pivot bushings of the two cup chains respectively to actuate the cup chains.

DESCRIPTION OF THE PREFERRED EMBODIMENT OF THE INVENTION

FIG. 1 illustrates a juice extracting machine of the general character disclosed in the above mentioned Wells patent. The apparatus has a frame 20 which incorporates a juice trough 22 leading to a discharge spout 24. The apparatus has a pair of conveyors 25 each of which comprises an endless chain of elastomer cups 26 which pass over corresponding pulleys at the two ends of the conveyor. As shown in FIG. 3 each cup 26 is formed with a pair of parallel slots 28 and as best shown in FIG. 4 the cups are linked together by pivot bushings 30.

In the construction shown, each cup 26 is formed at one end with a single central ear 32 and is formed at the other end with a pair of ears comprising a first ear 33 and a second ear 34 which are spaced and dimensioned to straddle a central ear. At the juncture of two cups a pivot bushing 30 is seated in three aligned bores comprising a bore 35 in the first straddling ear 33, a bore 36 in a central ear 32, and a bore 38 in the second straddling ear 34. As shown in FIG. 4, each cup is reinforced by an embedded flat metal bar 40 that has a circular aperture 42 at one end forming a portion of the bore 35 in the first straddling ear and has a circular aperture 44 at the other end forming a portion of the bore 36 in the central ear 32 of the cup. Thus the pivot bushings 30 and the metal reinforcement bars 40 form a metal conveyor chain.

The two conveyors 25 confront each other to cooperate to grasp newly received whole fruit and the two conveyors converge at each of their opposite ends and diverge towards a point midway of their length as may be seen in FIG. 2 where it is apparent that each of the conveyors changes direction at a slight angle at its midpoint.

A feeder wheel, generally designated 45, is provided at one end of the pair of conveyors 25 to supply whole citrus fruit to the cooperating pair of conveyors, the feeder wheel having radially extending blades 46 which form pockets 48 for the fruit. The feeder wheel structure includes a disc 50 on the near side of the wheel as viewed in FIG. 1, which disc closes one side of the wheel and one side of each of the pockets 48. The circumferential series of traveling pockets receive whole fruit from a side entry hopper that is on the far side of the wheel as viewed in FIG. 1. FIG. 1 shows in dotted lines how a plurality of fruit 52 in the side entry hopper is urged against the open side of the feeder wheel to feed the successive pockets 48.

The fruit that is fed to the pair of cooperating conveyors 25 by the feeder wheel 45 is carried by the conveyors 25 against a fixed knife 54 which bisects the fruit and leaves the fruit halves in the cups 26 of the two conveyors respectively. The fruit halves are carried along the lower runs of the two cup chains to a rotary juicer head 55 shown in part in FIG. 5 where a circular series of rotary reamer units 56 briefly enter the cups 26 to ream the fruit. The reamed skins of the fruit are carried by the upper runs of the two cup chains where suitable star wheels 58 shown in FIG. 2 enter the slots 28 of the cups to discharge the reamed skins into a hopper 60 before the cups again reach the feeder wheel 45.

The rotary juicer head 55 is power driven to actuate the movable parts of the apparatus. For this purpose the rotary juicer head drives the pair of cooperating conveyors 25 and, in turn, the cups 26 of the two conveyors mesh with the radial blade 46 of the feeder wheel 45 to drive the feeder wheel.

FIG. 5 indicates how two sets of laterally extending drive pins 62 on the opposite sides respectively of the juicer head 55 briefly enter the successive pivot bushings 30 to actuate the pair of cooperating conveyors 25.

It is apparent that each drive pin 62 enters a pivot bushing 30 at an acute angle and subsequently withdraws from the pivot bushing at an acute angle. The resultant frictional drag in alternate axial directions on each of the pivot bushings 30 tends to dislodge the pivot bushings axially and the purpose of the present invention is to effectively anchor the pivot bushings against such axial displacement. Effective anchorage keeps the apparatus from being damaged by displaced pivot bushings and, moreover, keeps the pivot bushings from being worn excessively by repeated slight axial movements in response to the frictional drag forces in the alternate directions. By completely eliminating even minor axial shift of the pivot bushings the invention reduces wear on the pivot bushings to a degree that causes the pivot bushings to outlast the cups 26 in which they are mounted.

At what may be termed the inner ends of the pivot bushings 30, i.e., the ends that repeatedly receive the drive pins 62, each pivot bushing is formed with an outer circumferential bead or flange 64 that abuts the corresponding circular aperture 42 in the reinforcement bar 40 of the cup. The bead 64 is of rounded cross section and the elastomer of the cup is formed with a corresponding inner circumferential groove 65 of curved cross section to fit the bead in a snug manner. The bead 64 and the cooperating groove 65 are old in the art.

The manner in which the invention positively anchors pivot bushings 30 against axial shift will now be explained.

The pivot bushing 30 is formed with an outer circumferential groove 66 near its outer end and the outer side of the groove forms an inwardly facing radial shoulder 68, the surface of which is perpendicular to the axis of the pivot bushing. The inner side of the circumferential groove 66 forms a tapered shoulder 70 that facilitates installation of the pivot bushing. The bore 38 through the elastomer material of the cup ear 34 is formed with an inner circumferential rib 72, one side of which provides the bore with an inner circumferential radial shoulder 74 perpendicular to the axis of the bushing to abut the other circumferential radial shoulder 68 of the pivot bushing in a positive manner. The second side of the rib forms a tapered inner circumferential shoulder 75 which conforms to the outer circumferential tapered shoulder 70 of the pivot bushing.

The outer end of the pivot bushing 30 is beveled or chamfered as indicated at 76 to facilitate insertion of the pivot bushing. When the pivot bushing is inserted into the three aligned bores 35, 36, and 38, the bead 64 of the pivot bushing snaps into the inner circumferential groove 65 of the bore 35 in the ear 33 and the inner circumferential rib 72 in the bore 38 of the ear 34 snaps into engagement with the outer circumferential groove 66 of a pivot bushing.

It is apparent that abutment of the bead 64 of the pivot bushing 30 against the rim of the circular aperture 42 in the reinforcement bar 40 serves as positive means to prevent outward axial shift of the pivot bushing. At the same time, the abutment of the radial shoulder 68 of the pivot bushing against the radial shoulder 74 of the inner circumferential elastomer rib 72 serves as positive means to block the opposite inward axial shift of the pivot bushing. Thus, in effect, the outer shoulder 68 and the bead 64 of the pivot bushing straddle the inner shoulder 74 of the bores and the inner shoulder formed by the rim 42 of the reinforcement bar 40 to lock the installed pivot bushing in place. In addition, the usual engagement of the bead 64 of the pivot bushing with the surrounding groove 65 of elastomeric material opposes axially inward shift of the pivot bushing.

The chamfer 76 on the outer or leading end of the pivot bushing not only facilitates installation of the bushing but also has utility for cooperation with a suitable tool (not shown) for removing the pivot bushing if removal of the pivot bushing ever becomes desirable.

The installed pivot bushing 30 may, if desired, be preloaded in tension for tighter anchorage of the pivot bushing. The preloading of the bushing in tension is accomplished by shaping and dimensioning each elastomer cup to make the axial distance between the radial shoulder 74 of the elastomer rib 72 and the inner circumferential groove 65 of the elastomer slightly greater in the absence of the pivot bushing than the axial distance between the outer circumferential radial shoulder 68 and the bead 64 of the pivot bushing so that to install the bushing it is necessary to distort the elastomer to an appreciable degree. The two straddling ears may be slightly flexed towards each other by the installed pivot bushing 30 to place the pivot bushing under the desired tension.

The normal operation of the apparatus inherently tends to cause the cups to deteriorate because the acid fruit juice floods the cups and seeks out all available crevices and because crevices tend to be developed by the cyclic bending of the cups. The cyclic changes in direction of travel of the cups by slight angles at the midpoints of the upper and lower runs of the cup chains stress the cups as may be seen in FIG. 4 and tend to destroy the bond between the elastomer and the embedded metal reinforcement bars. These causes of deterioration have heretofore made it necessary to replace cups after 300–1,000 hours of service and also have made it necessary to replace worn pivot bushings while the cups are still in operating condition. Surprisingly, it has been found that the improvement in the anchorage of the pivot bushings increases the service life of the cups to at least 2,000 hours with no necessity to replace worn pivot bushings during such a service period.

This detailed description of the selected embodiment of the invention will suggest various changes, substitutions and other departures from the disclosure within the spirit and scope of the appended claims.

I claim:

1. In a fruit processing apparatus incorporating a conveyor comprising a series of elastomer cups with each cup formed with a single ear at one end and with a pair of first and second ears at the other end, each pair of ears of one cup straddling a single ear of an adjacent cup with a pivot bushing extending through aligned pivot bores of the three ears to pivotally interconnect the two cups and wherein a power actuated rotary means has a circumferential series of laterally projecting drive pins that periodically briefly enter inner ends of the successive pivot bushings to actuate the conveyor, the improvement for positive anchorage of a pivot bushing in aligned bores of the three ears, comprising:

one of the aligned bores being formed with a first inner shoulder facing towards one end of the aligned bores;

the pivot bushing being formed with a first outer circumferential shoulder in cooperating abutment with said inner shoulder of the aligned bores to prevent axial shift of the pivot bushing towards the other end of the aligned bores;

one of the aligned bores being formed with a second inner radial shoulder facing towards said other end of the aligned bores;

and the pivot bushing being formed with a second outer circumferential radial shoulder in abutment with said second inner shoulder to prevent axial shift of the pivot bushing towards said one end of the aligned bores.

2. An improvement as set forth in claim 1 which includes a metal reinforcement embedded in the body of the cup and extending into one of the two straddling ears of the cup, said reinforcement having a circular aperture the rim of which forms at least part of said first inner shoulder of the aligned bores for abutment by said first outer circumferential shoulder of the pivot bushing.

3. An improvement as set forth in claim 1 in which the pivot bushing has an outer circumferential groove, one side of which provides said second outer circumferential radial shoulder of the pivot bushing; and in which one of the aligned bores is formed with an inner circumferential rib that is dimensioned to seat in said outer circumferential groove, one side of said rib forming said second inner radial shoulder of the aligned bores.

4. An improvement as set forth in claim 3 in which the other side of the outer circumferential groove in the pivot bushing forms a tapered outer circumferential shoulder and the corresponding side of the circumferential rib forms a complementary inner circumferential tapered shoulder to facilitate insertion of the pivot bushing into the aligned bores.

5. An improvement as set forth in claim 1 in which said first inner shoulder of the aligned bores is formed at least in part by a reinforcement embedded in the material of the cup.

6. An improvement as set forth in claim 1 in which the pivot bushing has an outer circumferential flange that forms said first outer circumferential radial shoulder of the pivot bushing.

7. An improvement as set forth in claim 5 in which one of the aligned bores is formed with an inner circumferential groove to seat said outer circumferential flange of the pivot bushing.

8. An improvement as set forth in claim 1 in which said inner shoulders are in said two straddling ears respectively and when the two straddling ears are unrestrained the distance between said inner circumferential shoulders of the ears differs from the distance between said outer circumferential shoulders of the pivot bushing, the difference being such that the installed pivot bushing resiliently distorts the material of the two straddling ears with consequent axial stressing of the bushing to discourage loosening of the engagement of the pivot bushing with the two straddling ears.

9. An improvement as set forth in claim 8 in which the two inner shoulders of the bore straddle the two outer shoulders of the pivot bushing and in the absence of the pivot bushing the distance between the two straddling inner shoulders is less than the distance between the two outer shoulders of the pivot bushing.

10. An improvement as set forth in claim 8 in which the elastomer of the two straddling ears is of a higher Shore hardness than the body of the cup.

11. An improvement as set forth in claim 1 in which one end of the pivot bushing is chamfered for the dual purpose of facilitating installation of the pivot bushing and of cooperating with a tool for withdrawal of the pivot bushing when desired.

* * * * *